(12) United States Patent
Py et al.

(10) Patent No.: US 6,790,390 B2
(45) Date of Patent: Sep. 14, 2004

(54) COMPOSITE MATERIAL COMPRISING ACTIVATED CARBON AND EXPANDED GRAPHITE

(75) Inventors: Xavier Py, Canohes (FR); Emmanuel Daguerre, Sete (FR); Vincent Goetz, Pollestres (FR); Bernard Spinner, Perpignan (FR)

(73) Assignee: Centre National de la Recherche Scientifique, Paris (FR)

( * ) Notice: Subject to any disclaimer, the term of this patent is extended or adjusted under 35 U.S.C. 154(b) by 81 days.

(21) Appl. No.: 10/182,134

(22) PCT Filed: Jan. 25, 2001

(86) PCT No.: PCT/FR01/00243

§ 371 (c)(1),
(2), (4) Date: Jul. 26, 2002

(87) PCT Pub. No.: WO01/55054

PCT Pub. Date: Aug. 2, 2001

(65) Prior Publication Data

US 2003/0003289 A1 Jan. 2, 2003

(30) Foreign Application Priority Data

Jan. 27, 2000 (FR) .......................................... 00 01056

(51) Int. Cl.[7] .......................... B01J 20/02; C01B 31/08
(52) U.S. Cl. .................. 264/29.1; 423/445 R; 502/418
(58) Field of Search .................... 264/29.1; 423/445 R; 502/418

(56) References Cited

U.S. PATENT DOCUMENTS 6,045,915 A * 4/2000 Bou et al. .................... 428/408

FOREIGN PATENT DOCUMENTS

EP 0 837 116 A1 4/1998

OTHER PUBLICATIONS

Chemical Abstracts Service, Japanese Publication No. 60–068559, Apr. 19, 1985.

Chemical Abstracts Service, Japanese Publication No. 61–032358, Feb. 15, 1986.

Lopez, M., et al., "Preparation of activated carbon from wood monolith", CARBON, vol. 34, No. 6, 1996, pp. 825–827, XP004022312.

* cited by examiner

Primary Examiner—Leo B. Tentoni
(74) Attorney, Agent, or Firm—Burns, Doane, Swecker & Mathis, L.L.P.

(57) ABSTRACT

The invention concerns a composite material comprising activated carbon and expanded graphite. The material is a block wherein the activated carbon is homogeneously and uniformly distributed in the form of microporous particles. The texture of said particles is characterised by a microporous volume $W_0$ ranging between 0.1 $cm^3g^{-1}$ and 1.5 $cm^3g^{-1}$ and a mean pore dimension $L_0$ ranging between 2 Å and 30 Å, the activated carbon particles have substantially the same texture wherever they are located in the composite material, the thermal conductivity levels of the material range between 1 and 100 $Wm^{-1}K^{-1}$. Said material is obtained by heat treatment of a mixture of expanded graphite and an activated carbon precursor in the presence of an activating agent at a temperature and for a time interval sufficient to obtain a wear rate of the activated carbon precursor ranging between 5 and 70% by mass.

15 Claims, 5 Drawing Sheets

COMPOSITE MATERIAL COMPRISING ACTIVATED CARBON AND EXPANDED GRAPHITE

BACKGROUND OF THE INVENTION

1. Field of the Invention

The present invention relates to a composite material comprising activated carbon and to a process for its preparation.

2. Description of the Related Art

Activated carbon has a great many and very old applications as carbonaceous adsorbent. It is conventionally prepared by a process consisting either in carbonizing a carbonaceous precursor and in then activating the carbon obtained using a physical activating agent or in activating the carbonaceous precursor directly using a chemical activating agent, the activation stage being in both cases accompanied by a heat treatment. Such a process generally results in a pulverulent solid product. However, the use of pulverulent activating carbons as adsorbent has many disadvantages. The pulverulent nature leads to head losses in the systems or the processes in which the activated carbon is used. In addition, the pulverulent activated carbon, if it is used as such, has a tendency to escape from the reactor in which it is used.

In addition, the activated carbons of the prior art, and the stationary beds of activated carbons, exhibit poor thermal conductivity, which limits their use in numerous industrial applications.

Very exceptional activated carbon precursors can be activated uniformly in the form of crushed grains. Thus, M. Lopez et al. (Preparation of activated carbon from wood monolith, Carbon, 1996, 34/6, 825–827) describes a process which consists in uniformly impregnating a carbon precursor (wood, almond or coconut shell, and the like) by steeping in an aqueous solution at 80° C. comprising an activating agent (for example, $H_3PO_4$ or $ZnCl_2$) or directly in concentrated acid (80% $H_3PO_4$). The impregnated precursor is subsequently dried and (or directly) activated at a temperature of the order of 500° C. for approximately one hour. The residual activating agent is subsequently removed by rinsing with water. However, the time necessary for the impregnation phase is very long, which limits the industrial and economic advantage of the process. Furthermore, the thermal stage of the activation process induces kinetic gradients in the grains and consequently textural gradients in the adsorbent. The grains thus obtained therefore do not possess uniform properties. The scale of the problem increases with the size of the grains.

Various processes for the preparation of an activated carbon in the form of a macroscopic composite material have been studied. In some processes of the prior art, preexisting activated carbon is used as starting material. Mention may be made, for example, of the process disclosed by T. K. Bose et al. (U.S. Pat. No. 4,999,330, 1991). In this process, particles of superadsorbent activated carbon are coated with a binder by suspending in a solution of said binder in a solvent, said solvent subsequently being removed by evaporation. The remaining product is compressed and heated. A portion of the binder is decomposed and approximately 10% of the porosity of the activated carbon is inhibited. Such a process has several disadvantages. The stage of coating the activated carbon with the binder is lengthy and expensive in energy because of the stage of evaporation of the solvent. In addition, a portion of the porosity of the activated carbon is lost, the adsorbent capacity of the composite material thus being lower than that of an initial pulverulent activated carbon. Another process of this nature is described by S. Follin ["Approche de Dubinin pour la caractérisation de charbons actifs et évaluation des performances de cycles frigorifiques à adsorption. Application à la production de froid par le couple charbon actif—$CO_2$" [Dubinin approach for the characterization of activated carbons and evaluation of the performance of adsorption refrigeration cycles. Application to the production of cold by the activated carbon—$CO_2$ couple], Thesis, IMP, University of Perpignan,1996]. This process is derived from the abovementioned Bose process, insofar as it consists in coating particles of activated carbon with a binder using a solution of the binder in a solvent and in then compressing after removal of the solvent. The improvement introduced lies in the addition of expanded natural graphite to the coated activated carbon after removal of the solvent and before compression. The presence of particles of expanded natural graphite substantially improves the thermal conductivity of the adsorbent composite material obtained. However, in this case too, a substantial loss of the adsorbent capacity, resulting mainly from the presence of the binder, is found. This loss can be of the order of 15 to 30%, according to the binder used.

In other processes, the activated carbon is prepared during the preparation of the composite material. For example, K. P. Gadkaree (Carbon honeycomb structures for adsorption applications, Carbon, 1998, 36/7–8, 981–989) describes a process which consists in preparing a support of honeycomb type made of extruded porous ceramic. This support is subsequently impregnated with a polymeric resin, for example a phenolic resin, of low viscosity. The assembly is subsequently dried, carbonized and activated, for example by carbonization under $N_2$ at 900° C. and then activation under $CO_2$ with burn offs of 25 to 30%. The composite material thus obtained forms a continuum and has very good mechanical strength. However, such a process can only be applied to polymeric precursors. In addition, the content of activated carbon and the thermal conductivity of the material obtained are low.

SUMMARY OF THE INVENTION

The aim of the present invention is to provide a macroscopic composite material, essentially comprising activated carbon and exhibiting good thermal conductivity, which can be easily shaped in order to be adjusted to various industrial uses. Another aim of the invention is a process for the preparation of such a material.

The composite material according to the invention comprises activated carbon and expanded graphite. It is characterized in that:

- it constitutes a block within which the activated carbon is distributed homogeneously and uniformly in the form of microporous particles;
- the texture of the microporous particles is characterized by a micropore volume $W_0$ of between 0.1 $cm^3.g^{-1}$ and 1.5 $cm^3.g^{-1}$ and a mean size of the micropores $L_0$ of between 2 Å and 30 Å;
- the particles of activated carbon have substantially the same texture, whatever their location in the composite material;
- the thermal conductivities of the material are between 1 and 100 W $m^{-1}K^{-1}$.

The composite material according to the invention can be provided in the form of a matrix of expanded graphite, within which the particles of activated carbon are uniformly distributed, said material being thermally anisotropic. It can also be provided in the form of a dispersion of graphite and of activated carbon within one another, said material then being thermally isotropic. In all cases, the macroporosity of the expanded graphite is between 10 μm and 800 μm. The activated carbon/expanded graphite ratio by weight in the material of the invention can vary within a very wide range. It is preferably between 50% and 99%.

The composite material according to the invention is obtained by a process which comprises a stage during which an activating agent and a mixture of expanded graphite and of an activated carbon precursor are subjected to a heat treatment at a temperature and for a time sufficient to produce a burn off of the activated carbon precursor of between 5 and 70% by mass. The term "burn off" is understood to mean a loss in mass of the activated carbon precursor during the heat treatment.

DETAILED DESCRIPTION OF THE PREFERRED EMBODIMENTS

The expanded graphite used in the process of the present invention can be obtained by the expansion processes of the prior art. Mention may be made, for example, of the process disclosed in FR-2 682 370, which consists in intercollating a reactant in a precursor material and in then subjecting the insertion compound obtained, optionally washed with water and dried, to a sudden rise in the temperature (thermal flash). The rapid departure of the intercollated material is accompanied by an irreversible unidimensional expansion (or exfoliation) of each graphite particle. Use may be made, as reactant, for example, of ferric chloride/ammonia mixtures or sulfuric acid. However, reactants having an exothermic decomposition are particularly advantageous. Mention may be made, among these reactants having an exothermic decomposition, of perchloric acid, used alone or as a mixture with nitric acid, or alternatively nitromethane. The bulk density of the expanded graphite thus obtained is very low (a few grams per $dm^3$, in contrast to 2 kg per $dm^3$ for the precursor material). Its specific surface is of the order of a few tens of $m^2/g$, whereas it is of the order of 1 $m^2/g$ for the precursor material. Preference is very particularly given to expanded graphite obtained from natural graphite.

The activated carbon precursor is a starting material with a high level of carbon. Mention may be made, by way of example, of pitches of any origin, cellulose materials and polymeric materials. Mention may be made, as cellulose materials, for example, of wood, almond shells, coconut shells and peat. Mention may be made, as polymeric material, of phenolic resins.

The pitches can be petroleum pitch, coal-tar pitch, paste derived from tires, wood pitch, vacuum pyrolysis pitch or pitch derived from various wastes. They are preferably used in the form of mainly mesogenic and partially mesophase pitches. A mainly mesogenic and partially mesophase pitch comprises from approximately 25 to 40% of α-type resin, from approximately 40 to 60% of β-type resin and from approximately 15 to 30% of γ-type resin. An α-type resin is a resin which is insoluble in toluene and in quinoline, a β-type resin is a resin which is insoluble in toluene and soluble in quinoline, and a γ-type resin is a resin which is soluble in toluene and in quinoline.

Various processes can be employed to produce a mainly mesogenic and partially mesophase pitch. According to a first process, a pitch comprising γ-type resins is subjected to a heat treatment and then the unpolymerized γ-type resins are selectively extracted with toluene. According to another process, a pitch comprising γ-type resins is subjected to heat treatment and then the unpolymerized γ resins are removed by distillation. According to a third process, a pitch comprising γ-type resins is subjected to a heat treatment in the presence of an oxidizing gas, for example by bubbling with air. Such processes are disclosed in more detail, for example, in patent application No. 99.14607.

The process for the preparation of activated carbon within a composite material comprising expanded graphite makes it possible to use, as activating agent, compounds which give rise to exothermic activation reactions, said compounds not being usable in the processes of the prior art. This is because the good thermoconductivity of the expanded graphite makes it possible to control the exothermic nature of the activation reaction by discharging the heat produced from the material. Thus, the activated carbon precursor is activated at the heart of the composite material under the same conditions as at the periphery of the material, the texture of the activated carbon grains then being substantially uniform in the material.

The process of the invention can be carried out with a liquid chemical activating agent, a pulverulent chemical activating agent or a physical activating agent.

In one alternative form of the process of the invention, a liquid chemical activating agent is used. The process then consists in :

producing a uniform mixture of activated carbon precursor, of liquid chemical activating agent and of divided expanded graphite and compressing in order to produce a consolidated block ;

subjecting the block to a heat treatment at a temperature of between 350° C. and 900° C. for a period of time sufficient to produce a burn off of the activated carbon precursor between 5 and 70% by mass;

removing the residual activating agent.

The liquid chemical activating agent is a liquid agent in the pure state or a liquid agent in the form of a concentrated solution. The activating agent can be, for example, a concentrated solution of strong acid or a molten salt. Just as during the use of an activating agent in the divided solid form, the proportion of liquid chemical activating agent CA with respect to the activated carbon precursor CP in the reaction mixture is preferably such that $0.5 \leq CA/CP \leq 5/1$ by weight.

When the activated carbon precursor is pitch, which is impermeable to solutions, the liquid activating agent coats the precursor particles. A paste composed of particles of activated carbon precursor which are coated by the activating agent and of particles of expanded graphite is thus obtained.

When the activated carbon precursor is a cellulose material, which is permeable to these solutions, the liquid activating agent impregnates the particles of activated carbon precursor to form a paste composed of particles of activated carbon precursor which are impregnated by the activating agent and of particles of expanded graphite. In this case, it is not necessary to compress the impregnated particles/expanded graphite mixture to form a block.

The size and the volume of the macroporosity increase with the level of liquid activating agent. This embodiment makes it possible to vary to a large extent the properties of the activated carbon obtained within the composite material, depending on the level of chemically activating agent used. At low levels of impregnation or of coating, materials are obtained which have the properties of activated carbons possessing high selectivity inherent in a low macropore volume and a low mean pore size. At high levels of impregnation or of coating, materials are obtained which have the properties of superadsorbent activated carbons inherent in a high micropore volume and a high mean pore size. The novelty related to the use of a liquid chemical agent and of a cellulose material as activated carbon precursor is the production of a thermally isotropic composite material. Another advantage lies in the fact that the mixture obtained in the form of a paste before activation by heat treatment can be modeled and can therefore be shaped by simple molding, without compression, or by extrusion. The blocks of composite material comprising activated carbon having highly varied shapes can thus be easily obtained. The blocks can be prepared continuously.

In another alternative form of the process of the invention, the chemical activating agent is in the form of a powder. The process then consists in:
  preparing a uniform mixture of an activated carbon pulverulent precursor, of expanded graphite and of a divided chemical activating agent, which mixture is compressed to form a consolidated block ;
  subjecting the consolidated block to a heat treatment under a neutral atmosphere at a temperature between 350° C. and 600° C. for a time sufficient to produce a burn off of the activated carbon precursor of between 5 and 70% by mass;
  removing the residual chemical activating agent.

When the chemical activating agent is in the form of a powder, it is preferable to use a mean grain size less than or equal to the size of the porosity of the consolidated matrix of natural graphite.

The chemical activating agent in the form of a divided solid is chosen from the group consisting of strong bases, such as ground anhydrous or weakly hydrated potassium hydroxide, acids, such as phosphoric acid, and Lewis acids. Mention may in particular be made of zinc chloride, $K_2S$, KCNS, NaCl and $FeCl_3$.

When a chemical activating agent in the form of a divided solid is used, the proportion of chemical activating agent CA with respect to the activated carbon precursor CP in the reaction mixture is preferably such that $0.5 \leq CA/CP \leq 5/1$ by weight. The volume of the macroporosity of the composite material obtained increases with the level of chemical activating agent, the mean diameter of the macroporosity remaining constant. Thus, the bulk density of the block of composite material decreases when the level of chemical activating agent increases. For the highest levels of chemical activating agent, the cohesion of the composite material decreases, the block of composite material becoming less dense and less resistant. This disadvantage can be overcome by subjecting the block of composite material obtained after activation to an additional compression in a mold, which can be that in which the compression prior to the activation heat treatment was carried out.

The neutral atmosphere under which the heat treatment is carried out is created in the reaction medium by nitrogen, argon or helium.

After the heat treatment, the material in the form of a consolidated block is subjected to washing, to remove the residual activating agent, until a neutral washed liquor is obtained. Washing is carried out with a solvent of said residual activating agent. The solvent is generally water.

Implementation of the process of the invention using a chemical activating agent in the form of a pulverulent solid is simple as only powders are used. However, it is not possible, by implementing the process in this way, to adjust the properties of the composite material within a wide range due to lack of effectiveness of the contact between activating agent and the precursor particle. The composite materials obtained have the properties of activated carbons possessing high selectivity.

When the process of the invention employs an activated carbon precursor in the form of a powder and a physical activating agent, it comprises the following stages :
  preparation of a pulverulent mixture of expanded graphite and of activated carbon precursor,
  compression of said mixture in a mold to produce a consolidated block,
  bringing the consolidated block obtained into contact with the physical activating agent and heat treatment.

The heat treatment is preferably carried out at a temperature of between 800° C. and 1100° C. for a time sufficient to produce a burn off of the activated carbon precursor of between preferably between 20 and 70% by mass.

The physical activating agent is a gas chosen from the group consisting of $CO_2$, a mixture of $CO_2$ and of $H_2O$, a mixture of $CO_2$ and of inert gas, a mixture of $CO_2$ or of $H_2O$ in an inert gas, pure $H_2O$ in the form of steam or $H_2O$ diluted in an inert carrier gas. The heat treatment is carried out conventionally at a temperature of between 800° C. and 1100° C. for a time sufficient to obtain a burn off of the activated carbon precursor of between 30 and 70% by mass. These materials are less dense than the materials obtained by chemical activation but they exhibit a poorer homogeneity between the texture of the periphery and the texture at the center of the block of material.

The composite materials in the form of a block obtained by the embodiments of the process of the invention, using either a finely divided solid chemical activating agent or a physical activating agent, are thermally anisotropic materials. They exhibit a radial thermoconductivity $\lambda_r$ and an axial thermoconductivity $\lambda_a$. This results from a partial orientation of the planes of expanded graphite during the compression of the mixture of powders. In general, $\lambda_a$ is virtually independent of the density of the expanded graphite matrix, whereas $\lambda_r$ is highly sensitive to this parameter. The radial thermal conductivity $\lambda_r$ is always very significantly greater than the axial thermal conductivity $\lambda_a$. This property is particularly advantageous in processes in which the material is used in the form of a cylindrical block, in particular as packing for a cylindrical column, when good thermal transfer between the packing and the wall of the column and a limitation on any form of axial dispersion are desired.

It is thus apparent that the process of the invention, consisting of preparing the activated carbon by activation of the precursor within a composite material comprising expanded graphite, makes it possible to obtain an absorbent in the form of a consolidated block, thus eliminating the disadvantages related to the conventional use of pulverulent activated carbon. The process retains the porosity of the activated carbon and measurements carried out have shown that the microporosity of the activated carbon within the composite material is identical to that of the pulverulent activated carbon which would have been obtained from the same precursor. The performance of the composite material is not poorer during use as adsorbent owing to the fact that the accessibility of the pores to fluids is not reduced by the preparation process. On the contrary, an acceleration in the adsorption/desorption processes is observed due to the action of the expanded graphite on the corresponding heats. The presence of expanded graphite exhibits an additional advantage as a result of its good thermal conductivity, which compensates for the low thermal conductivity of the activated carbon. This is because the majority of the applications of activated carbons generate thermal effects which it is desirable to remove, and this removal is greatly promoted by the presence of the expanded graphite.

Finally, the preparation process makes it possible to obtain the composite material in a form directly adapted to the application for which it is intended. For the stage of activation by heat treatment, the mixture of activated carbon precursor and of expanded graphite can be introduced into a mold which has the shape desired for the application of the material. Mention may be made, by way of example, of the perforated disks used as adsorbents for reactors for the storage of gases, such as $H_2$, $CH_4$ or $CO_2$, or for heat machines, adsorbent materials in the form of cylinders for exchangers, or components having a specific shape for structured packings intended for the treatment of fluids or for heterogeneous catalytic reactions. The optional additional recompression makes it possible to adjust the shape, the porosity and the density of the block of composite material. In general, the block of composite material obtained retains the shape imposed by the mold in which the first compression and the activation heat treatment are carried out. When the mechanical strength obtained after activation is unsatisfactory, the block is reshaped in the initial mold. This reshaping makes it possible, in addition, to control the density of the block of composite material. For example, an unrecompressed block of cubic shape having an initial block density of approximately 100 kg.m$^{-3}$ can be densified to 410 kg.m$^{-3}$ by a recompression under a pressure of 200 bar. At the same time, this recompression results in a decrease in the macroporosity and an optimum can be defined for adjusting the characteristics of each material to the application for which it is intended. The adsorbent action of the material is regulated by the choice of the microporosity of the activated carbon present within the composite material. The thermal conductivity of the material is regulated by the choice of the density of the expanded graphite. The performance in terms of material transport is determined by the permeability of the composite material, by the postactivation shrinkage of the activating agent (when it is a chemical agent) and by the level of optional recompression of the block of composite material after the activation heat treatment. The hydrodynamic properties are laid down by the shaping of the material and determine the material transfer and heat transfer between the fluid and the block during its use.

The present invention is described in more detail using the following examples, given by way of illustration but to which the invention is not limited.

EXAMPLE 1

Preparation of a Composite of Activated Carbon and of Expanded Natural Graphite Starting from Coal-tar Pitch, by Coating with Potassium Hydroxide Use was made of an upgraded coal-tar pitch, that is to say a coal-tar pitch for which the level of β resins has been increased by a heat treatment accompanied by partial oxidation by reactive bubbling. Said upgraded coal-tar pitch was ground to particles of a size of between 50 μm and 200 μm. The pitch particles were subsequently suspended in an aqueous potassium hydroxide solution comprising the minimum amount of water, that is to say, in the present case, in a 54.7% by weight solution (corresponding to the solubility limit of KOH in water at 80° C.). The suspension thus obtained was heated to 80° C. and stirred until the water had completely evaporated. An anhydrous powder was thus obtained, which powder was ground to produce pitch particles coated with potassium hydroxide having a size of less than 250 μm.

Various tests were carried out using various potassium hydroxide/pitch ratios by mass of between 0.5/1 and 5/1, the other conditions being identical.

The powder formed from pitch impregnated with potassium hydroxide was subsequently mixed with expanded natural graphite (ENG), the pitch/ENG ratio by weight being 6/1. The mixture obtained was introduced into a mold and shaped as a parallelepiped (2.5×0.5×0.5 cm) under a pressure of 100 bar. The block of activatable carbon thus obtained was placed in a nickel cell, brought to a temperature of 800° C. under an inert nitrogen atmosphere at a rate of 10° C./min, and held at this temperature for 2 hours. After cooling, the block (composed of particles of activated carbon distributed within a matrix of expanded natural graphite) was rinsed with water until a neutral aqueous rinse liquor was obtained, in order to remove the activating agent residue, and then dried in an oven at 120° C.

EXAMPLE 2

Preparation of A Composite of Activated Carbon and of Expanded Natural Graphite Starting from Coal-tar Pitch, by Solid/Solid Mixing The procedure of example 1 was repeated but by bringing the pitch into contact with the potassium hydroxide by mixing the pitch powder with ground anhydrous potassium hydroxide having a particle size in the region of 100 μm. The other stages of the process are identical to those of example 1.

EXAMPLE 3

Preparation of A Composite of Activated Carbon and of Expanded Graphite Started from a Cellulose Residue 3 g of cellulose residue composed of dried almond shell were ground to produce particles having a diameter of less than 225 μm. The particles obtained were suspended in a 700 g/l aqueous $ZnCl_2$ solution and the suspension was brought to a temperature of 80° C. and was maintained at this temperature for 21 hours with stirring.

After filtration and drying at 120° C., the recovered impregnated powder was mixed with expanded natural graphite ENG in impregnated powder/ENG proportions by mass of 7/1. The mixture of powders was compressed in a mold under a pressure of 80 bar and a consolidated block was obtained. The block was brought under an inert atmosphere to a temperature of 600° C. at a rate of 4° C./min and was maintained at this temperature for 5 hours. After cooling, rinsing with water and drying, an adsorbent block having a level by mass of activated carbon of 57% was obtained, said activated carbon exhibiting the properties of a superadsorbent ($W_0$=1.23 cm$^3$.g$^{-1}$, $L_0$=27 Å; $S_{BET}$=1 700m$^2$/g).

EXAMPLE 4
Preparation of a Composite Starting from Pine Wood

Pine wood sawdust was mixed with 85% phosphoric acid and ENG. The mixture was subsequently subjected to a heat treatment in a tube furnace while flushing with air at 80° C. for 3 hours, then 170° C. for 1 hour, and 480° C. for 30 min.

The composite material obtained comprises 84% by mass of activated carbon, which has the following characteristics: $W_0=0.42 cm^3 \cdot g^{-1}$, $L_0=14.6$ Å; $S_{BET}=1\ 208\ m^2/g$.

This material exhibits a thermal isotropy which is particularly advantageous for processes which require good thermal conductivity and good permeability in all directions, such as, for example, the storage of gas.

EXAMPLE 5
Characterization of the Materials Obtained by the Process of Examples 1 and 2

The micropore volume and the size of the micropores of the activated carbon present within the composite material obtained in the various tests of examples 1 and 2 were determined. The distribution of the size of the macropores of the ENG matrix in the various composite materials obtained was also determined. In addition, the distribution of the mean size of the macropores of the ENG matrix of the blocks prepared respectively according to examples 1 and 2 was determined.

The micropore volume of the particles of activated carbon and the mean sizes of the micropores of the particles of activated carbon were determined by the standard method on the ASAP-2000 device from Micromeritics, by nitrogen isotherm at 77 K.

Figure 1:
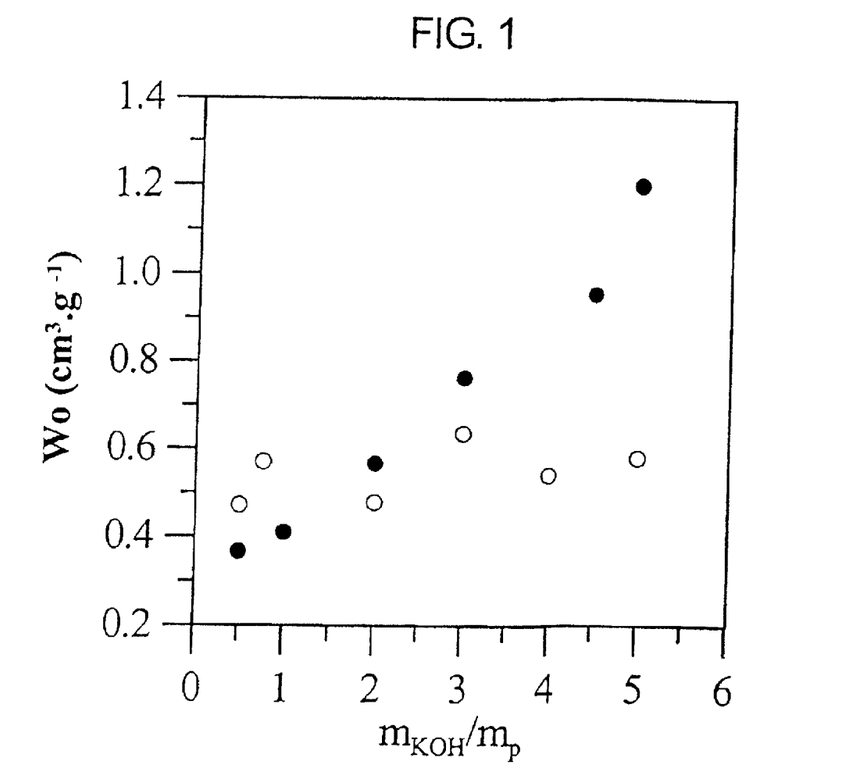
FIG. 1 of the Drawing graphically represents the changes in the micropore volume $W_0$ of activated carbon present in a composite material as a function of the initial level by mass of potassium hydroxide.
Figure 2:
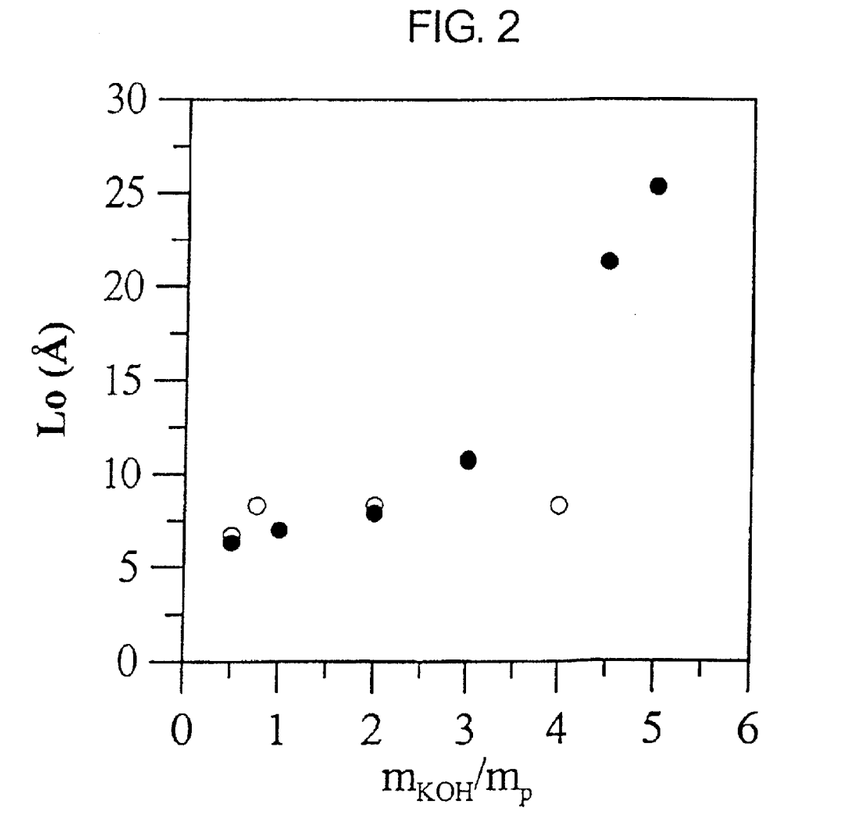
FIG. 2 of the Drawing graphically represents the change in the mean size of the micropores $L_0$ of the activated carbon as a function of the level of potassium hydroxide.

FIG. 1 represents the change in the micropore volume $W_0$ (expressed in $cm^3 \cdot g^{-1}$) of the activated carbon present in the composite material as a function of the initial level by mass of potassium hydroxide (as mass of potassium hydroxide $m_{KOH}$ to mass of precursor $m_p$). FIG. 2 represents the change in the mean size of the micropores $L_0$ (expressed in Å) of the activated carbon as a function of the level of potassium hydroxide. In both figures, the values represented by ● correspond to the materials of example 1 and the values represented by ○ correspond to the materials of example 2.

It is apparent that the micropore volume of the activated carbon varies within the range from 0.5 $cm^3 \cdot g^{-1}$ to 1.2 $cm^3 \cdot g^{-1}$ and the mean size of the micropores within the range from 5 Å to 25 Å. It should be noted that, when the activating agent and the pitch are brought into contact by the solid/solid technique, whatever the level of activating agent, the values of micropore volume and of size of the micropores remain within the range of the activated carbons possessing high selectivity used in particular as carbonaceous molecular sieves (low pore volume and low size of the micropores, for example 0.5 $cm^3 \cdot g^{-1}$, 5 Å). On the other hand, the technique of coating the pitch with an aqueous potassium hydroxide solution makes it possible to prepare both materials possessing high selectivity (for the lowest levels of impregnation) and materials of the superadsorbent type having a higher micropore volume and a higher mean size of the micropores (for example 1.2 $cm^3 \cdot g^{-1}$, 25 Å).

The mean size of the macropores of the ENG matrix was determined using a mercury porosimeter.

Figure 3:
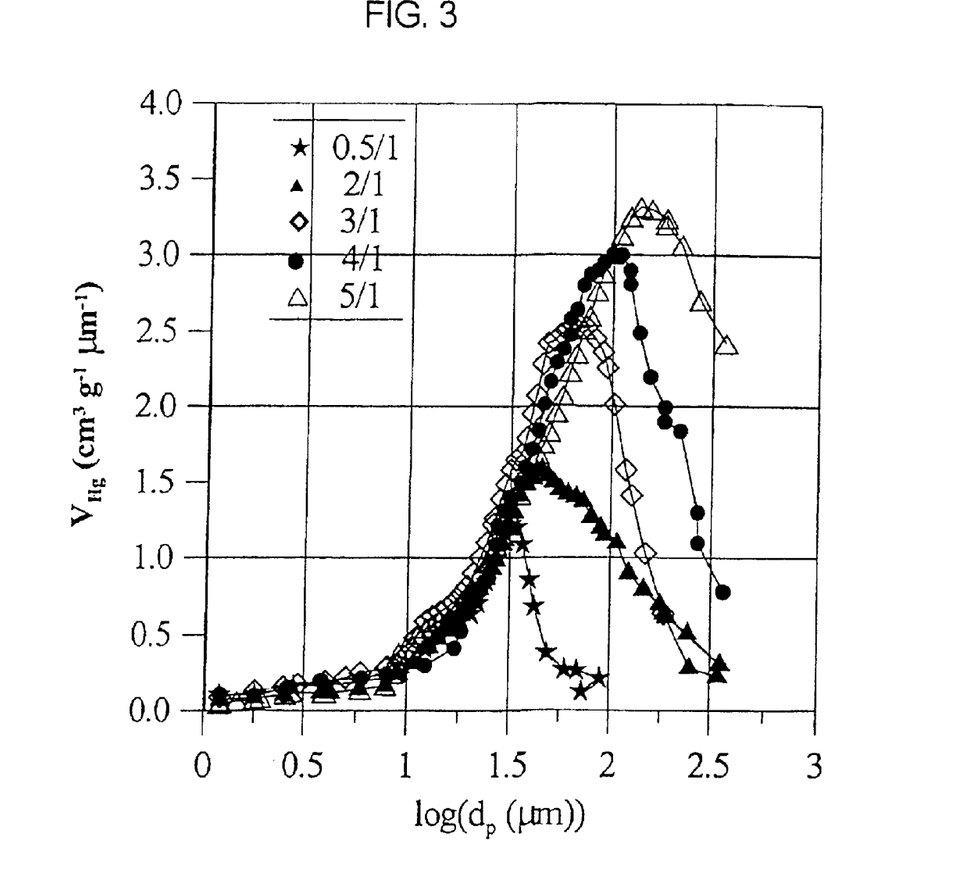
FIG. 3 of the Drawing graphically represents the distribution of the size of the macropores $V_{HG}$ as a function of the size of the pores $d_p$.

FIG. 3 represents the distribution of the size of the macropores $V_{Hg}$ in the blocks obtained according to example 1, expressed as volume of intrusion of Hg ($cm^3/g/\mu m$) as a function of the size of the pores $d_p$ (expressed in $\mu m$). Likewise, FIG. 4 represents the mean size of the macropores of the blocks according to example 2.

In FIG. 3, the curves correspond to various levels of KOH/pitch impregnation varying from 5/1 and 0.5/1. Thus:

the curve △ represents a level of 5/1
the curve ● represents a level of 4/1
the curve ◇ represents a level of 3/1
the curve ▲ represents a level of 2/1
the curve ★ represents a level of 0.5/1.

Figure 4:
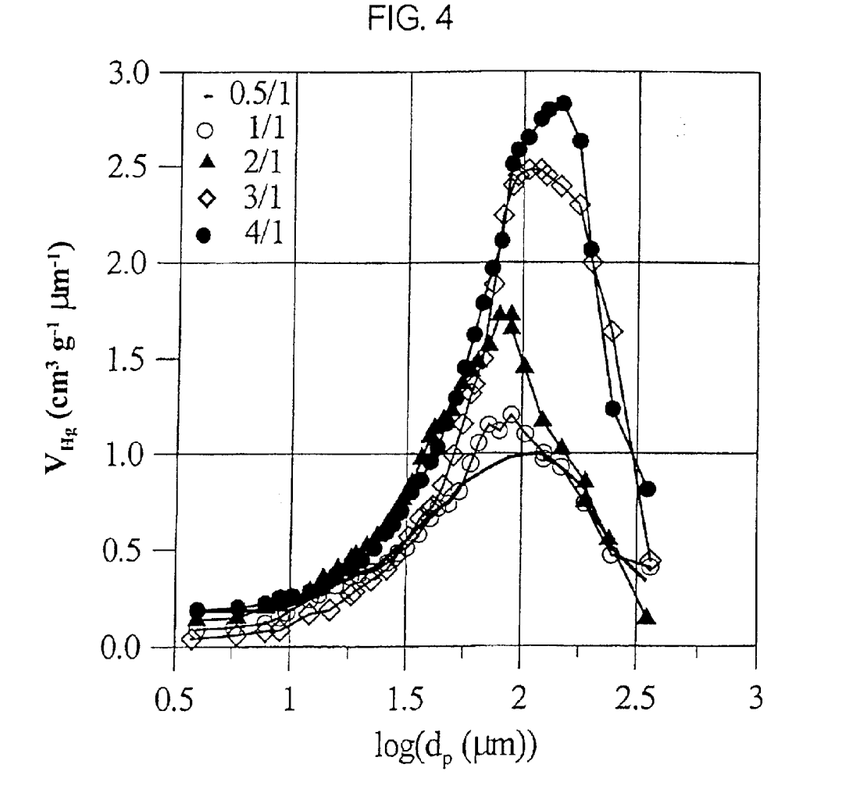
FIG. 4 of the Drawing graphically represents the mean size of macropores as a function of the size of the pores $d_p$ FIG. 5 of the Drawing graphically represents the variation in the micropore volume $W_0$ as a function of the size of the micropores $L_0$.

In FIG. 4, the curves correspond to various levels of KOH/pitch impregnation varying between 4/1 and 0.5/1. Thus:

the curve ● represents a level of 4/1
the curve ◇ represents a level of 3/1
the curve ▲ represents a level of 2/1
the curve ○ represents a level of 1/1
the curve − represents a level of 0.5/1.

It is apparent that the mean size of the macropores of the blocks is set by the sizes of the powders used and varies between 50 $\mu m$ and 200 $\mu m$. It is also apparent that the macropore volume increases with the activating agent/pitch ratio. Thus, the bulk density of the blocks decreases when the level of activating agent used during activation increases. This bulk density varies between 100 and 450 $kg \cdot m^{-3}$ when the potassium hydroxide/pitch ratio changes from 5/1 to 1/1.

Figure 5:
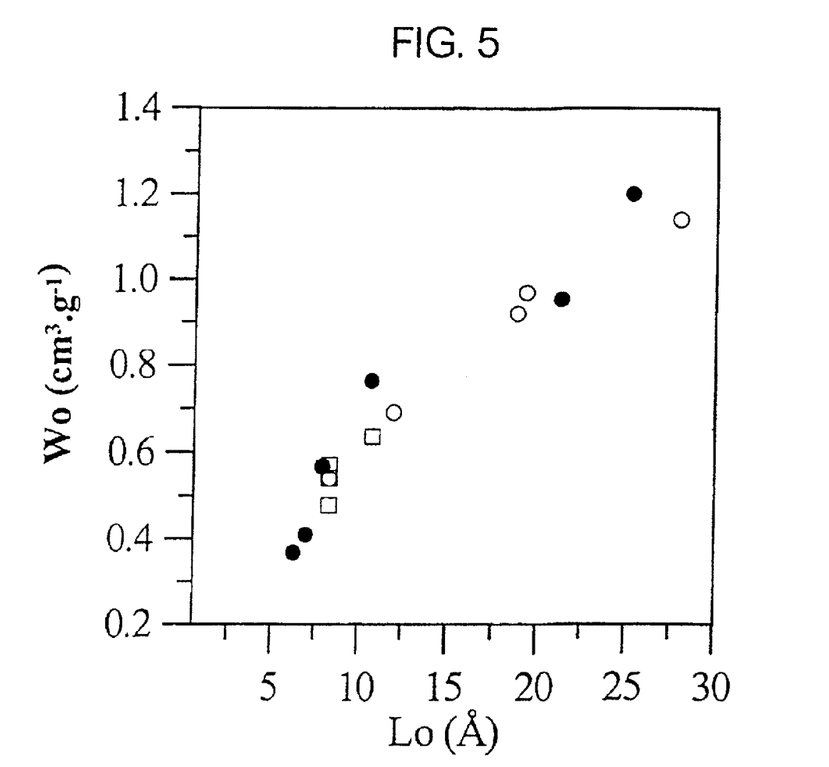

The change in the microporosity of the activated carbons by activation with potassium hydroxide within a matrix of expanded natural graphite was compared with that of a matrix-free activated carbon. FIG. 5 represents the variation in the micropore volume $W_0$ (in $cm^3 \cdot g^{-1}$) as a function of the size of the micropores $L_0$ (in Å) for a pulverulent activated carbon without an expanded graphite matrix (●), for an activated carbon within a matrix of expanded graphite according to example 1 (○) and for an activated carbon within a matrix of expanded graphite according to example 2 (□). This figure shows that, whatever the technique chosen, the products obtained exhibit the same adsorbent properties, the change in their microporosity properties describing a single curve. The activated carbon within a matrix of expanded natural graphite exhibit similar properties to those of an activated carbon of the prior art. It is thus shown that the fact of activating the carbon within the matrix of expanded graphite does not interfere with the process of conversion of the carbonaceous precursor into adsorbent material. The texture of a particle of activated carbon within the composite material remains unchanged, whether the particle is situated at the center of the block of composite material or at its periphery.

What is claimed is:

1. A process for the preparation of composite material comprising activated carbon and expanded graphite, wherein:
   said material constitutes a block within which the activated carbon is distributed homogeneously and uniformly in the form of microporous particles;
   the texture of the microporous particles is characterized by a micropore volume $W_0$ of between 0.1 $cm^3 \cdot g^{-1}$ and 1.5·$cm^{-1}$ and a mean size of the micropores $L_0$ of between 2 Å and 30 Å;
   the particles of activated carbon have substantially the same texture, whatever their location in the composite material;
   the thermal conductivities of the material are between 1 and 100 $Wm^{-1}K^{-1}$,
   said process comprising subjecting an activating agent and a mixture of expanded graphite and an activated carbon precursor to a heat treatment at a temperature and for a time sufficient to produce a burn off of the activated carbon precursor of between 5 and 70% by mass.

2. The process as claimed in claim 1, characterized in that the activated carbon precursor is a pitch, a cellulose material or a polymeric material.

3. The process as claimed in claim 2, characterized in that the cellulose material is wood, almond shells, coconut shells or peat.

4. The process as claimed in claim 2, characterized in that the pitch is a mainly mesogenic and partially mesophase pitch.

5. The process as claimed in claim 1, characterized in that the activating agent is a chemical activating agent in the form of a divided solid.

6. The process as claimed in claim 5, characterized in that it consists in:
- preparing a uniform mixture of an activated carbon pulverulent precursor, of expanded graphite and of a divided chemical activating agent, which mixture is compressed to form a consolidated block;
- subjecting the consolidated block to a heat treatment under a neutral atmosphere at a temperature between 350° C. and 600° C. for a time sufficient to produce a burn off of the activated carbon precursor of between 5 and 70% by mass;
- removing the residual chemical activating agent.

7. The process as claimed in claim 5, characterized in that the chemical activating agent is chosen from the group consisting of strong bases, phosphoric acid and Lewis acids.

8. The process as claimed in claim 1, characterized in that the activating agent is a chemical agent CA, the proportion of which with respect to the activated carbon precursor CP in the reaction mixture is such that $0.5 \leq CA/CP \leq 5/1$ by weight.

9. The process as claimed in claim 1, characterized in that the activating agent is a chemical agent in the form of a liquid.

10. The process as claimed in claim 9, characterized in that it consists in:
- producing a uniform mixture of activated carbon precursor and of liquid chemical activating agent and of divided expanded graphite in compressing in order to produce a consolidated block;
- subjecting the block to a heat treatment at a temperature of between 350° C. and 900° C. for a period of time sufficient to produce a burn off of the activated carbon precursor between 5 and 70% by mass;
- removing the residual activating agent.

11. The process as claimed in claim 9, characterized in that the liquid chemical activating agent is a liquid agent in the pure state or a liquid agent in the form of a concentrated solution.

12. The process as claimed in claim 11, characterized in that the liquid activating agent is a concentrated solution of acid or a molten salt.

13. The process as claimed in claim 1, characterized in that the activating agent is a physical agent.

14. The process as claimed in claim 13, wherein the physical activating agent is a gas chosen from the group consisting of $CO_2$, a mixture of $CO_2$ and $H_2O$, a mixture of $CO_2$ and inert gas, a mixture of $CO_2$ and $H_2O$ in an inert gas, pure $H_2O$ in the form of steam or $H_2O$ diluted in an inert carrier gas.

15. The process as claimed in claim 13, characterized in that it comprises the following stages:
- preparation of a pulverulent mixture of expanded graphite and of activated carbon precursor,
- compression of said mixture in a mold to produce a consolidated block,
- bringing the consolidated block obtained into contact with the physical activating agent and heat treatment at a temperature of between 800° C. and 1100° C. for a time sufficient to produce a burn off of the activated carbon precursor of between 30 and 70% by mass.

* * * * *